(12) United States Patent
Schuetz et al.

(10) Patent No.: US 11,979,655 B2
(45) Date of Patent: May 7, 2024

(54) METHOD TO DETECT AND OVERCOME DEGRADATION IMAGE QUALITY IMPACTS

(71) Applicant: GM Global Technology Operations LLC, Detroit, MI (US)

(72) Inventors: Kathleen Marie Schuetz, Avondale, PA (US); Andrew W. Averhart, Redford, MI (US)

(73) Assignee: GM GLOBAL TEHCNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 17/490,595

(22) Filed: Sep. 30, 2021

(65) Prior Publication Data

US 2023/0098949 A1  Mar. 30, 2023

(51) Int. Cl.
| | |
|---|---|
| *H04N 7/18* | (2006.01) |
| *B60R 11/04* | (2006.01) |
| *G06T 7/00* | (2017.01) |
| *H04N 23/60* | (2023.01) |
| *B60R 11/00* | (2006.01) |

(52) U.S. Cl.
CPC ............ *H04N 23/64* (2023.01); *B60R 11/04* (2013.01); *G06T 7/0002* (2013.01); *B60R 2011/0026* (2013.01); *G06T 2207/30168* (2013.01); *G06T 2207/30252* (2013.01)

(58) Field of Classification Search
CPC .......... H04N 23/64; H04N 7/18; B60R 11/04; B60R 2011/0026; G06T 7/0002; G06T 2207/30168; G06T 2207/30252

USPC ......................................................... 348/148
See application file for complete search history.

(56) References Cited

U.S. PATENT DOCUMENTS

| | | | | |
|---|---|---|---|---|
| 5,923,027 | A * | 7/1999 | Stam | H04N 23/00 250/341.7 |
| 7,196,305 | B2 * | 3/2007 | Shaffer | G06T 7/0002 250/221 |
| 8,494,251 | B2 * | 7/2013 | Camus | H04N 13/296 382/154 |
| 8,711,220 | B2 * | 4/2014 | Tiana | H04N 7/18 348/148 |
| 8,854,455 | B2 * | 10/2014 | Haug | G06V 20/56 348/135 |
| 11,176,703 | B1 * | 11/2021 | Stumpf | G01C 21/30 |
| 2015/0294453 | A1 * | 10/2015 | Nakano | H04N 23/64 348/135 |

* cited by examiner

*Primary Examiner* — Trang U Tran
(74) *Attorney, Agent, or Firm* — Vivacqua Crane, PLLC

(57) ABSTRACT

Method of detecting and overcoming degradation of image quality during a weather event and activation of windshield wipers. The method takes a high-contrast region of interest (ROI) of an image captured by a camera of a vehicle vision system, applies a Laplacian Operator that focuses on the pixel level in the ROI, and calculates a variance of the Laplacian. Images having an ROI below a predetermined variance threshold are classified or flagged as a low-quality image. Once a low-quality image is flagged, the camera settings can be readjusted in a feedback loop to compensate for the loss in quality of the captured image. This method may be stored as a software routine and implemented by a vision control module of the vision system.

10 Claims, 3 Drawing Sheets

METHOD TO DETECT AND OVERCOME DEGRADATION IMAGE QUALITY IMPACTS

INTRODUCTION

The present disclosure relates to vehicle imaging systems, more particularly to a method of detecting and overcoming degraded image quality impact.

Modern motor vehicles are equipped with external sensors that monitor an exterior area surrounding a host vehicle for improving the host vehicle's situational awareness. Examples of external sensors include, but are not limited to, image sensors, radar sensors, and Light Detection and Ranging (LiDaR) sensors. Such external sensors are typically part of a host vehicle's driver assistance system that may include various active safety systems and autonomous driving systems.

Typically, image sensors are part of a vision system that communicates with various driver assistance systems of the vehicle. Electronic cameras are commonly used as image sensors for passenger vehicles. The cameras are strategically placed about the vehicle to capture exterior images of surrounding areas of the vehicle. A common location to place a forward viewing camera is inside the cabin of the vehicle behind the windshield to protect the camera from environmental contaminants. The image data captured by the camera are processed by the vision system before the image data is communicated to the various driver assistance systems.

The windshield adequately protects the camera from exterior contaminants such as rain, snow, dust, dirt, etc. Windshield wipers are utilized to clear exterior contaminates off the windshield. However, each swipe of the windshield wipers may leave random patches of thin films of residual contaminants that may affect the quality of the images captured by the forward viewing camera. Weather events such as rain and snow may also affect the quality of the images captured by the forward viewing camera.

Thus, while current vehicle vision systems having a camera positioned in the cabin behind the windshield achieve the intended purpose of protecting the camera from the external contaminants, there is a need for detecting and overcoming degraded quality of the images captured by the camera caused by contaminants on the windshield and weather events.

SUMMARY

According to several aspects, a method of detecting and overcoming degradation of image quality impacts for a vehicle is disclosed. The method includes capturing, by an image sensor, an exterior image of a surrounding area of the vehicle, wherein the image sensor includes adjustable image capture settings; detecting, by a control module, whether a predetermined vehicle system is in an activated state, wherein the predetermined vehicle system comprises one or more of a windshield wiper system, an external lighting system, a windshield defrost system, and a precipitation detection system; determining, by the control module, an image quality of the exterior image when the predetermined vehicle system is detected in the activated state; determining, by the control module, whether the image quality of the exterior image is below a predetermined quality threshold; and instructing, by the control module, the image sensor to adjust the image capture settings to increase an image quality of a subsequent captured image above the predetermined quality threshold when the image quality of the exterior image is below the predetermined quality threshold.

In another aspect of the present disclosure, the method further includes flagging, by the control module, the exterior image when the image quality of the exterior image is below the predetermined quality threshold; and forwarding, by the control module, the flagged image to a driver assistance control module.

In another aspect of the present disclosure, wherein the step of determining, by the control module, whether the image quality of the exterior image is below the predetermined quality threshold, includes: selecting a region of interest in the exterior image, analyzing the region of interest to determine whether the region of interest is below a predetermined regional quality threshold, and determining the image quality of the exterior image to be below the predetermined quality threshold when the region of interest is determined to be below the predetermined regional quality threshold.

In another aspect of the present disclosure, the region of interest is selected based on a predetermined level of contrast between an object and a background of the object.

In another aspect of the present disclosure, wherein the step of determining, by the control module, whether the image quality of the exterior image is below the predetermined quality threshold, includes: selecting a plurality of regions of interest in the image, analyzing each of the plurality of regions of interest to determine whether one or more of the plurality of regions of interest is below a predetermined regional quality threshold, and determining the quality of the exterior image to be below the predetermined quality threshold when a predetermined ratio of regions of interest are below the predetermined regional quality threshold.

In another aspect of the present disclosure, wherein the step of analyzing each of the plurality of regions of interest to determine whether one or more of the plurality of regions of interest is below the predetermined quality threshold includes: applying a Laplacian operator to analyze each of the plurality of regions of interests, calculating a variance of the Laplacian operator, and comparing the calculated variance with a predetermined variance threshold to determine whether the one or more of the plurality of regions of interest is below the predetermined quality threshold.

In another aspect of the present disclosure, wherein the image sensor is a forward-facing camera mounted behind a windshield of the vehicle.

According to several aspects a method of detecting and overcoming degradation of image quality impacts for a vehicle is provided. The method includes collecting, by an image sensor, an exterior image of the vehicle; determining, by a driver assistance control module, whether a wiper system of the vehicle is activated; identifying, by a vision control module, at least one region of interest in the exterior image when the wiper system of the vehicle is activated; determining, by the vision control module, whether the at least one region of interest is degraded; determining, by the vision control module, the exterior image is a low-quality image when the at least one region of interest is degraded; adjusting, by the image sensor, an image sensor setting when the exterior image is determined to be a low-quality image; flagging, by the vision control module, the exterior image when the exterior image is determined to be a low-quality image; and initiating, by the control module, one of deleting the flagged exterior image and forwarding the flagged exterior image to a driver assistance control module.

In an additional aspect of the present disclosure, wherein the step of determining, by the control module, whether the at least one region of interest is degraded includes applying a Laplacian operator.

In an additional aspect of the present disclosure, wherein the at least one region is a dynamic region of interest.

According to several aspects, a vehicle configured to implement the above methods is provided. The vehicle includes an image sensor position behind a windshield of the vehicle, wherein the image sensor is operable to capture an exterior image of the vehicle; a windshield wiper system having a wiper operable to swipe across an exterior surface of the windshield; and a vision control module configured to: determine whether the windshield wiper is activated, analyze the quality of the exterior image when the windshield wiper is activated, instruct the image sensor to adjust one or more image capture settings to increase the quality of a subsequent captured image when the exterior image is below a predetermined quality threshold, use a Laplacian operator in determining whether the image quality of the exterior image is below the predetermined quality threshold, and define one or more region of interest around an area surrounding one or more objects have above a predetermined contrast level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, a control module means any one or various combinations of one or more processors, associated memory, and other components operable to execute a software, firmware, program, instruction, routine, code, and algorithm to provide the described functions. Processors include, but not limited to, Application Specific Integrated Circuits (ASIC), electronic circuits, central processing units, microprocessors, and microcontrollers. Associated memory includes, but not limited to, read only memory (ROM), random access memory (RAM), and electrically programmable read only memory (EPROM). Functions of a control module as set forth in this disclosure may be performed in a distributed control architecture among several networked control modules. A control module may include a variety of communication interfaces including point-to-point or discrete lines and wired or wireless interfaces to other control modules.

Software, firmware, programs, instructions, routines, code, algorithms and similar terms mean any control module executable instruction sets including methods, calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing vehicle operation. Alternatively, routines may be executed in response to occurrence of an event, software calls, or on demand via user interface inputs or requests.

Figure 1:
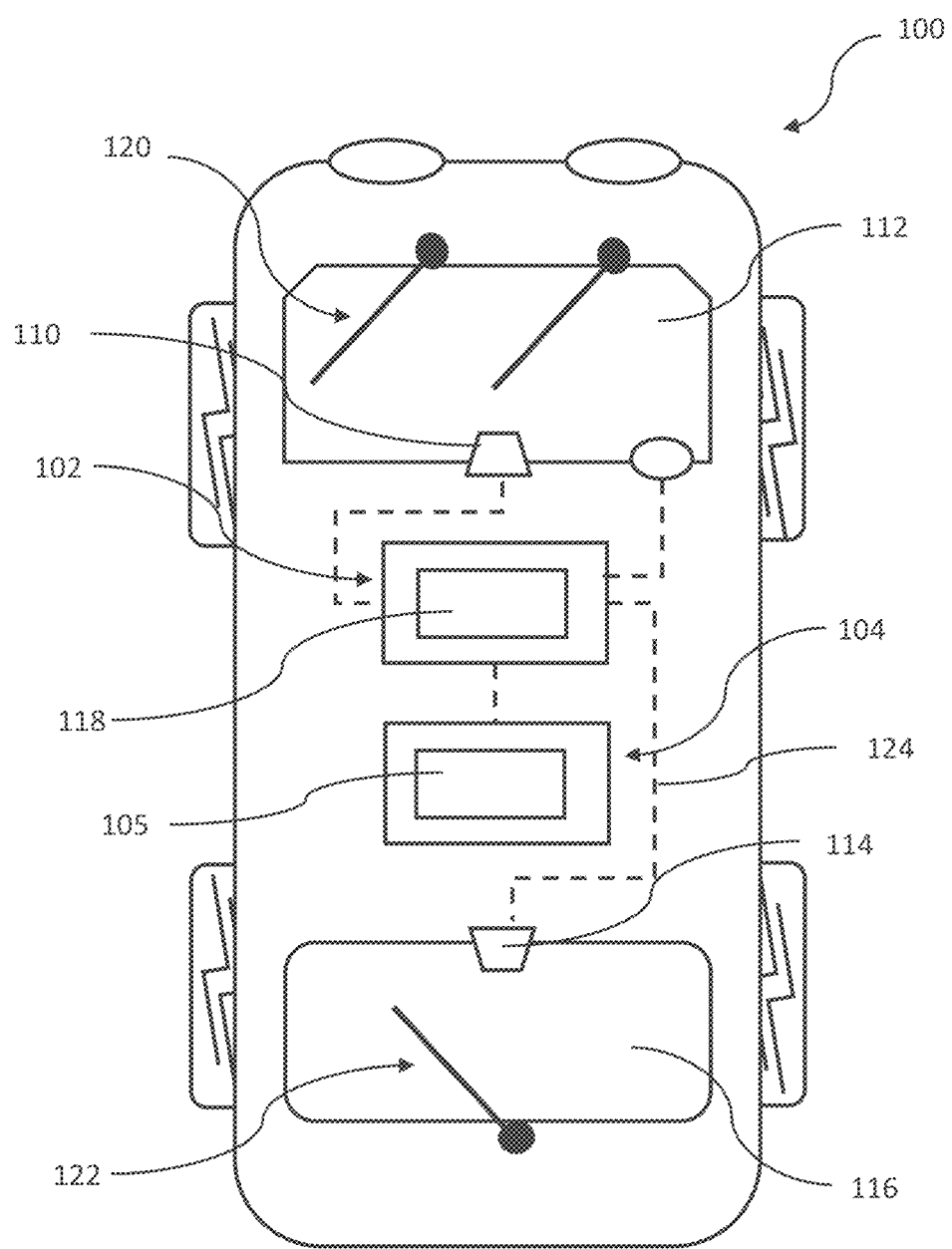
FIG. 1 is a diagrammatic plan view of a vehicle having a vision system vision and a driver assistance system, according to an exemplary embodiment.

FIG. 1 shows a vehicle 100 having an on-board vision system 102 in communication with a driver assistance system 104. The on-board vision system 102 includes a vision control module 103 and the driver assistance system 104 includes a driver assistance control module 105. In the exemplary embodiment shown, the vehicle 100 may be an automobile, a light truck, a sport utility vehicle, a van, a bus, a large truck, or the likes. The driver assistance system 104 represents, in the aggregate, one or more vehicle systems that rely on image data received from the vision system 102 for the proper functionality of the one or more vehicle systems. Examples of driver assistance systems include, but are not limited to, collision alert systems, collision avoidance systems, cruise control systems, lane change assist systems, and partial to full autonomous driving systems.

The on-board vision system 102 includes at least one forward-facing image sensor 110 located in a cabin of the vehicle behind a front windshield 112, at least one rearward facing image sensor 114 located in the cabin of the vehicle 100 behind a rear windshield 116, and the vision control module 103. The at least one forward facing image sensor 110 is operable to electronically capture images exterior of and forward of the vehicle 100. Similarly, the at least one rearward facing image sensor 114 is operable to electronically capture images exterior of and rearward of the vehicle 100. The vehicle 100 includes a pair of front windshield wipers 120 and at least one rear windshield wiper 122 operable to clear precipitation and external environmental contaminates from the front windshield 112 and rear windshield 116, respectively, to provide an unobstructed view for the forward-facing image sensor 110 and the rearward facing image sensor 114.

Communications between the image sensors 110, 114, vision system 102, driver assistance system 104, and other associated components may be accomplished by using a direct wired point-to-point link, a networked communication bus link, a wireless link or another suitable communication link 124. Communication includes exchanging data signals in suitable form, including, for example, electrical signals via a conductive medium, electromagnetic signals via air, optical signals via optical waveguides, and the likes. The data signals may include discrete, analog, or digitized analog signals.

The image sensors 110, 114 may be that of electronic cameras having a charge-coupled device (CCD) or a complementary metal oxide semiconductor (CMOS) image sensor that is operable to capture multiple frames of images comprising millions of pixels, which are electronically stored and transmitted as image data. The image data may be processed by the image sensors 110, 114 and/or vision control module 103 to enhance the contrast, brightness, color intensity, and sharpness of each pixel to improve the quality of the still images before transmitting it to driver assistance control module 105. The image data may be then processed by the driver assistance control module 105 to detect and identify objects, such as the roadway, road signs, lane marker, vehicles, pedestrians, and other objects that are necessary for the operations of a particular safety system. Therefore, it is desirable for the images captured by the image sensors 110, 114 to be as high quality as possible in order to have sufficient information in the image data for the driver assistance control module 105 to process to detect and identified objects. High quality image means a clear, sharp, and detailed image with minimal blurring and distortions.

In the example presented, the image sensors 110, 114 are electronic cameras 110, 114 operable to adjust camera settings such as exposure, color intensity, contrast, brightness, sharpness, noise, gain, and the likes to capture high quality images. The vision control module 103 is operable to analyze the quality of the images captured by the electronic cameras 110, 114 to determine if the image quality meets a minimal threshold before transmitting the images to the driver assistance control module 125. If the quality of the captured image is below the predetermined minimal threshold, the vision control module 103 may further adjust the quality of the captured image above the minimal threshold before sending the image to the driver assistance control module 105. The vision control module 103 may also instruct the cameras 110, 114 to readjust the camera settings to improve the quality of the images being captured.

Figure 2:
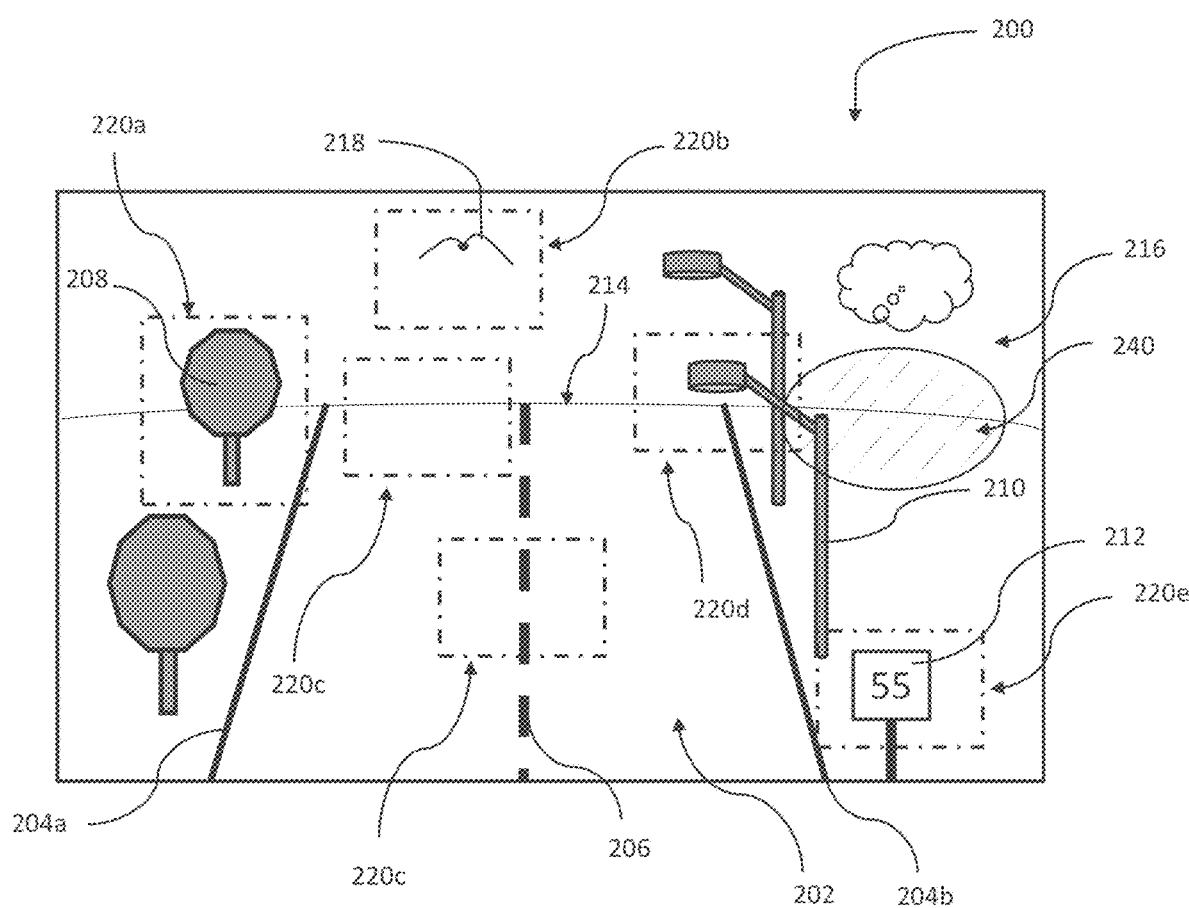
FIG. 2 is a diagrammatic representation of a frame of a forward-facing image captured by a forward-facing image sensor, according to an exemplary embodiment.

FIG. 2 is a diagrammatic representation of a forward image 200 captured by the forward-facing camera 110 through the front windshield 112 of the vehicle 100. The forward image 200 shows a roadway 202 on which the vehicle 100 is traveling. The roadway 202 is defined between a pair of solid lines 204a, 204b. The roadway 202 is divided into a two-lane roadway by a broken-centerline 206. Shown on either side of the roadway 202 are a plurality of trees 208, lamp posts 210, and road signs 212. The roadway 202 extends toward a distant horizon 214 where the roadway 202 appears to meet the sky 216. A bird 218 is shown flying in the sky 216 moving from a right to a left portion of the forward image 200.

The forward image 200 shows a plurality of regions of interest (ROI) 220a, 220b, 220c, 220d, 220e. Each of the ROI is selected based on a predetermined level of contrast between a detected object and a background of the detected object, or between two or more adjacent objects. It is preferable that the predetermined level of contrast is sufficiently high to distinguish the outline of the detected object from the background. For example, the ROI 220a is selected due to the relatively high contrast between the outline of the tree 208 and the sky 216, the ROI 220b is selected due to the relatively high contrast between the bird and the sky 216, the ROI 220c is selected due to the relatively high contrast between the road 202 and the sky 216, and so on. The ROI may be static such as ROI 220a. The ROI may also be dynamic such as 220b, where the ROI 220b is tracked across the image with the position of the bird 218 as the moving reference.

The quality of the image data captured by the front and rear cameras may be degraded, such as blurred or distorted, by accumulation of environmental contaminants on the respective windshields and/or weather precipitations such as rain and snow. The vehicle windshield wipers may be activated to remove excess contaminants and to clear the windshield of rain and snow. However, the wiping action of the windshield wiper across the windshield may occasionally leave a thin film 240 of residual environmental contaminants, including random patches rain, ice, or snow, on the windshield. The thin film 240 of residual may undesirably impact the quality of the images by obstructing, distorting, or blurring the image captured by the camera. Furthermore, precipitation such as rain between the camera and detected objects may also undesirably impact the quality of the images.

Figure 3:
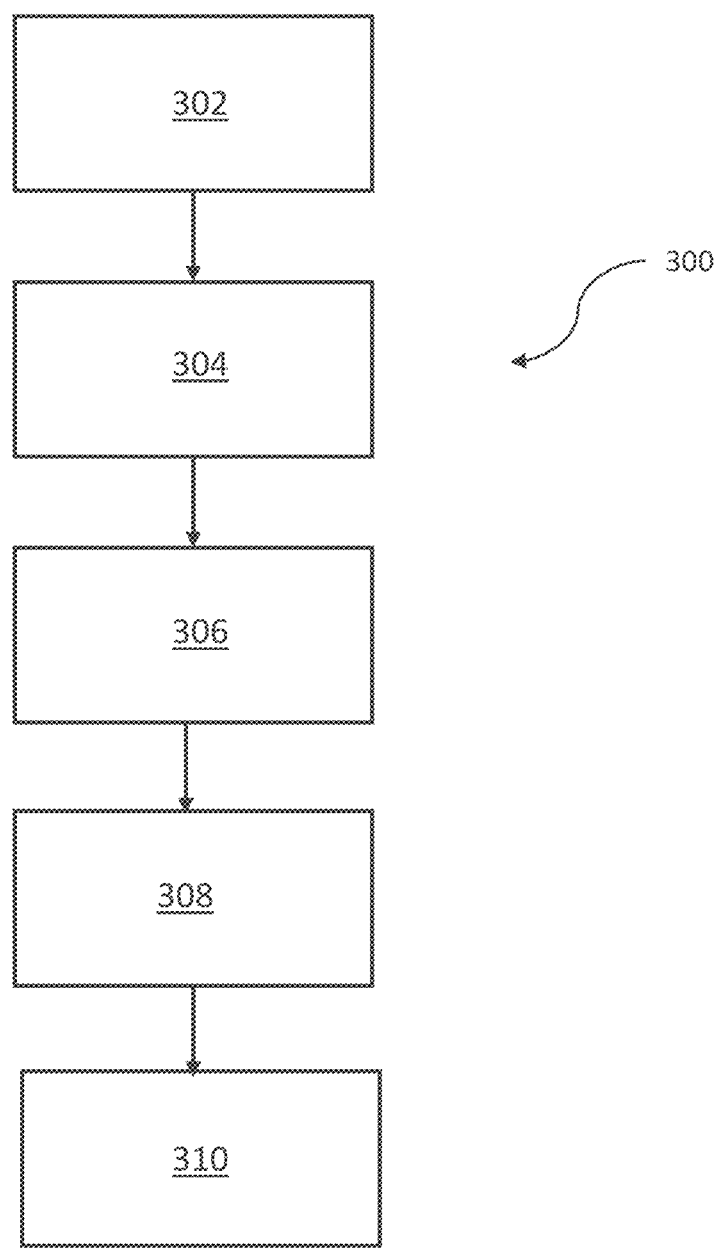
FIG. 3 is a block flow chart of a method of detecting and overcoming degraded image quality impact, according to an exemplary embodiment.

FIG. 3 is a block flow chart of a method of detecting potential degraded image quality captured by the camera and overcoming or mitigating the image quality impact (method 300). The method takes a small high-contrast region of interest (ROI) of a current image, applies a Laplacian operator that focuses on the pixel level of the ROI, and calculates a variance of the Laplacian. From the calculated variance of the Laplacian, a threshold can be found and images with a variance that falls below this threshold are classified or flagged as a low-quality image. Once a low-quality image is flagged, a command is sent to the camera to adjust the camera settings to compensate for degradation in quality. This method may be stored as a software routine and implemented by the vision control module of the vision system 102.

The method 300 begins in block 302, where the forward camera captures a plurality of still images or a dynamic video of a field of view forward of the vehicle 100. The images are captured as millions of pixels of image data and communicated to the vision module.

Moving to block 304, the vision control module determines whether there is a precipitation event, such as rain or snow. Such precipitation events may be determined by an activation of one or more of a windshield wiper system, an external lighting system, a windshield defrost system, and a precipitation detection system.

Moving to block 306, vision control module analyzes the images and defines at least one region of interest (ROI) when a precipitation event or a wiper activation is present. Each ROI is selected based on a relatively high contrast between a detected object and a background of the object, or a relatively high contrast between two or more detected adjacent objects. The ROI may be a static ROI with respect to a stationary object such as the roadway or a dynamic ROI that changes positions with respect to the stationary object.

Moving to block 308, a Laplacian operator is applied on the least one ROI to determine a quality of the image of the objects within the ROI by determining the sharpness of the detected object and background in the ROI. A variance or an average variance is then found that is either above or below a predefined threshold variance or predefined threshold average variance. The predefined threshold may be dependent on camera type, location, or other variables that affect the camera or vision system 102. The Laplacian operator is used to measure the 2nd derivative of an image. The Laplacian operator analyzes the high contrast regions of an image containing rapid intensity changes such as between the edge of the detected object and the background. If an image contains high variance then there is a wide spread of responses, both edge-like and non-edge like, representative of a normal, in-focus image. However, if there is very low variance, then there is a tiny spread of responses, indicating there are very little edges in the image. The less edges present suggests the more blurred, or lower quality, of the image. Examples of using a Laplacian operator in determining image quality can be found in "Diatom autofocusing in brightfield microscopy: a comparative study" by J. L. Pech-Pacheco et al., 2002, which is incorporated herein in its entirety.

Moving to block 310, if a predetermined number of ROI per image or a predetermined ratio of ROIs per image is determined to be below a predetermined minimal quality threshold, then the vision module sends a command to the cameras to readjust the camera settings to improve the quality of the images being captured. The camera continues to readjust the camera settings in a feedback loop until the vision control module determines that the quality of captured images is at or above the predetermined quality level. If any of the captured sill images is determined to be below threshold standards, these captured images may be flagged. The flagged images may be deleted or communicated to the driver assistance system with a status of "flagged". Depending on the needs of the particular driver assistance system, the flagged images may be ignored or used for less critical functions.

The above disclosure provides a vehicle with a vision system and method for detecting and overcoming degraded quality of the images, captured by a camera located behind a windshield, caused by contaminants on the windshield and weather events. It should be noted that the above disclosure exemplary method is not limited to forward facing cameras, but is also applicable to rearward or sideward facing cameras located behind a windshield.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of detecting and overcoming degradation of image quality impacts for a vehicle, comprising:
    capturing, by an image sensor, an exterior image of a surrounding area of the vehicle, wherein the image sensor includes adjustable image capture settings;
    determining, by a control module, an image quality of the exterior image;
    determining, by the control module, whether the image quality of the exterior image is below a predetermined quality threshold; and
    instructing, by the control module, the image sensor to adjust the image capture settings to increase an image quality of a subsequent captured image above the predetermined quality threshold when the image quality of the exterior image is below the predetermined quality threshold;
    wherein determining, by the control module, whether the image quality of the exterior image is below the predetermined quality threshold, includes:
        selecting a plurality of regions of interest (ROI) within the exterior image,
        determining a regional quality of each of the plurality of ROI,
        determining a total number of ROI having a regional quality below a predetermined regional quality threshold, and
        determining the image quality of the exterior image to be below the predetermined quality threshold when a predetermined ratio of ROI per image is determined to be below a predetermined minimal quality threshold, wherein an individual ROI is selected based on a predetermined level of contrast between an object and a background of the object, and wherein determining the regional quality of each of the plurality of ROI includes: applying a Laplacian operator to calculate a variance between an edge of the object and the background of the object, and determine the individual ROI to be below the predetermined regional quality threshold when the calculated variance is below a predetermined variance threshold.

2. The method of claim 1 further including comprising:
    flagging, by the control module, the exterior image when the image quality of the exterior image is below the predetermined quality threshold; and
    forwarding, by the control module, the flagged image to a driver assistance control module.

3. The method of claim 1, wherein the image sensor is a camera mounted behind a windshield of the vehicle.

4. The method of claim 3, wherein the camera is one of a forward-facing camera and a rear-ward facing camera.

5. A method of detecting and overcoming degradation of image quality impacts for a vehicle, comprising:
    collecting, by an image sensor, an exterior image of the vehicle;
    identifying, by a vision control module, a plurality of regions of interest (ROI) in the exterior image, wherein an individual ROI is selected based on a predetermined level of contrast between an object and a background of the object;
    determining, by the vision control module, a total number of ROI below a regional threshold; and
    determining, by the vision control module, the exterior image is a low-quality image when a predetermined ratio of ROI per image is determined to be below a predetermined minimal quality threshold;
    wherein determining, by the vision control module, a total number of ROI below the regional threshold includes:
        analyzing each of the plurality of ROI by applying a Laplacian operator to calculate a variance between an edge of the object and the background of the object, and
        determining an individual ROI to be below a predetermined regional quality threshold when the calculated variance is below a predetermined variance threshold.

6. The method of claim 5, further comprising:
    adjusting, by the image sensor, an image sensor setting when the exterior image is determined to be a low-quality image.

7. The method of claim 6, further comprises:
    flagging, by the vision control module, the exterior image when the exterior image is determined to be a low-quality image.

8. The method of claim 7, further comprising:
    initiating, by the vision control module, one of deleting the flagged exterior image and forwarding the flagged exterior image to a driver assistance control module.

9. The method of claim 5, wherein at least one of the plurality of ROI region is a dynamic region of interest.

10. A vehicle comprising:
    an image sensor position behind a windshield of the vehicle, wherein the image sensor is operable to capture an exterior image of a surrounding area of the vehicle; and a vision control module configured to:
  select a plurality of regions of interest (ROI) within the exterior image,
  determine a regional quality of each of the plurality of ROI,
  total a number of ROI having a determined regional quality below a predetermined regional quality threshold, and
  determine an the image quality of the exterior image to be below a predetermined quality threshold when a predetermined ratio of ROI per image is determined to be below a predetermined minimal quality threshold, wherein the vision control module is further configured to: instruct the image sensor to adjust one or more image capture settings to increase a quality of a subsequent captured image when the exterior image is below a predetermined quality threshold,
  wherein the vision control module is further configured to use a Laplacian operator in determining whether an image quality of the exterior image is below the predetermined quality threshold, and
  wherein the vision control module is further configured to define one or more of the plurality of ROI based on a predetermined level of contrast between an object and a background of the object.

* * * * *